(No Model.)

G. W. FETNER.
STEAM PACKING.

No. 491,539. Patented Feb. 14, 1893.

Witnesses
Wm A Schoenborn
D. P. Wolhaupter

Inventor
George W. Fetner.
By his Attorneys,
C A Snow & Co.

THE NORRIS PETERS CO., PHOTO-LITHO., WASHINGTON, D. C.

UNITED STATES PATENT OFFICE.

GEORGE W. FETNER, OF COLUMBIA, SOUTH CAROLINA.

STEAM-PACKING.

SPECIFICATION forming part of Letters Patent No. 491,539, dated February 14, 1893.

Application filed June 2, 1892. Serial No. 435,282. (No model.)

*To all whom it may concern:*

Be it known that I, GEORGE W. FETNER, a citizen of the United States, residing at Columbia, in the county of Richland and State of South Carolina, have invented a new and useful Steam-Packing, of which the following is a specification.

This invention relates to steam packing; and it has for its object to provide certain improvements in metallic packing for piston rods, valve stems, and the like, which will be much more durable than packing ordinarily employed, and which can be readily removed and replaced without deranging any part of the engine or valve mechanism according to the position in which the packing is used.

To this end the main and primary object of the invention is to generally improve upon the construction of rod or stem packing.

With these and many other objects in view which will readily appear as the nature of the invention is better understood, the same consists in the novel construction, combination and arrangement of parts hereinafter more fully described, illustrated and claimed.

Figure 1:
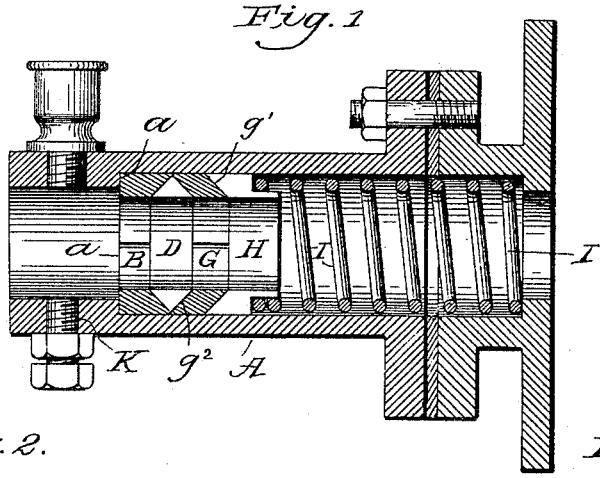
Figure 2:
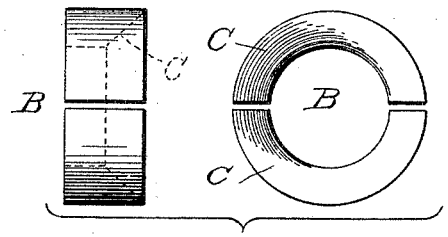
Figure 3:
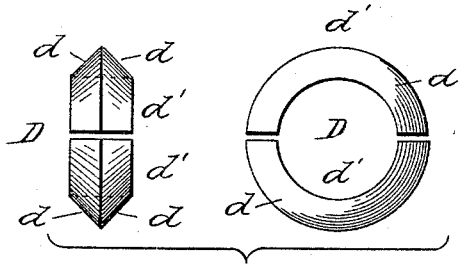
Figure 4:
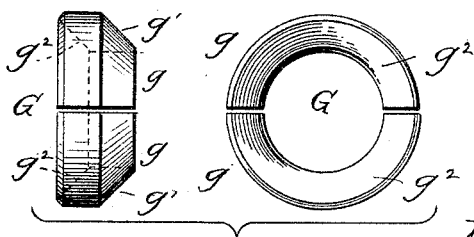
Figure 5:
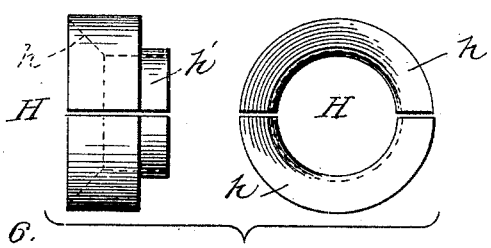
Figure 6:
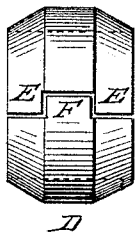

In the accompanying drawings;—Figure 1 is a vertical sectional view of a packing box having my improved packing therein. Figs. 2, 3, 4, and 5 are detail views of the packing collar, the intermediate packing rings and the end follower respectively. Fig. 6 is a detail modification of one of the packing rings.

Referring to the accompanying drawings;—A represents the stuffing box of ordinary construction and is preferably made by removably securing an ordinary gland to the head of the cylinder, or a valve chest in order that the same may be removed when desired to remove the packing as will be quite apparent. The stuffing box A is provided near its outer end thereof, with the shoulder $a$ against which rests the fixed packing collar B. The said packing collar B is provided with an interiorly beveled edge or side C, within which is designed to snugly rest one side of the double cone or oppositely exteriorly beveled packing ring D. As stated the said packing ring D is exteriorly beveled on each edge thereof as at $d$, so as to fit at one side in the interiorly beveled side or edge of the fixed packing collar. The said packing ring D is split and comprises the registering semi-circular members $d'$ so as to provide a flexible ring which allows for the taking up of wear and presents less friction to the piston or valve rod. As illustrated in the modification of Fig. 6 the said beveled sectional packing ring may be provided with the interlocking tongues and notches E and F respectively at the registering ends thereof so as to prevent lateral displacement of the rings as will be readily apparent.

Next to and fitting over the sectional packing ring D is the auxiliary sectional packing ring G. The said auxiliary sectional packing ring G comprises the registering semi-circular members $g$ and is provided with the exteriorly and interiorly beveled portions $g'$ and $g^2$ respectively, formed in opposite sides of the same, or such beveled portions may be more properly termed as the exterior male bevel $g'$ at one side of the interior female bevel $g^2$ at the other side, which female bevel portion fits over one of the bevel sides of the double bevel ring D. The exteriorly beveled portion $g'$ of the ring G registers with the interiorly beveled portion $h$ of the packing follower H. The said packing follower H is provided with a projecting collar $h'$ at one side thereof, over which bears the packing spring I, which clamps the follower over the auxiliary packing ring and tightly holds the various members of the entire packing together, so that the packing rings inclosed between the packing ring and the follower, owing to the beveled connections, are set out onto the piston or valve rod, and form a perfectly steam tight joint possessing the many advantages herein set forth. It will of course be understood, that the packing collar and follower may be sectional to correspond with the packing ring as illustrated in dotted lines, but the joints of the several parts of the packing break with each other in the ordinary manner.

Owing to the construction herein described and the special arrangement and fitting of the bevels of the rings, the said rings have their exterior peripheries in alignment with each other and adapted to contact with the inner sides of the stuffing box so as to prevent any play of the rings away from the rod, and so that the same under the steam pressure are always held onto said rod.

Working into the stuffing pack at one end thereof in front of the shoulder $a$ is the set bolt and jam nut K, which is employed to tighten the valve stem when the packing is used on the valve stem, in case the engine breaks or for any other purpose whatever. An ordinary oil cup L is also connected with the stuffing box to thoroughly lubricate the rod working therein.

It will be apparent to those skilled in the art that the hard metal collar B and the hard metal follower H, act in the capacity of cap rings for the intermediate packing rings D and G, and that the latter two rings are of the usual wearing packing metal which, on account of being always held tight onto the rod necessarily must wear out in time. By the construction herein described, in which the ring D, is of an inverted V-shape, the ring G fits over one of the beveled faces thereof and serves in the capacity of the follower therefor. Now it will be obvious that under the pressure of the spring, the rings D and G, are constantly set onto the reciprocating rod moving therethrough, and as the said rings wear out, the follower H approaches the collar or cap ring B. On account of the double bevel or inverted shape of the ring D, said ring necessarily is the first ring to wear out, and on account of the pressure of the spring and the reciprocations of the rod, as the ring D, wears out, the female ring G, follows the diminishing shape of the ring D, until the latter has completely worn out, at which time the auxiliary or female ring G, has assumed the original inverted V shape of the ring D, and replaces the same between the collar and follower B and H, which are then either touching or in close proximity to each other. All that is now necessary is to renew the auxiliary or female ring G, to make the packing complete as originally specified. It will therefore be seen that the female ring always takes the place of the male ring D and thereby renders it necessary to only replace one ring at a time, and that the packing therefore always remains tight upon the piston rod, and the insertion of a new ring does not render the packing liable to leakage as is customary in packing of this character.

Having thus described my invention, what I claim and desire to secure by Letters Patent is:—

The combination with a removable stuffing box having an inner shoulder at one end; of the constant rod packing comprising a fixed sectional packing collar resting against said shoulder and having an interiorly beveled edge, an oppositely beveled inverted V-shape sectional packing ring having one side thereof adapted to register with the inner beveled edge of said collar, a sectional auxiliary female packing ring having an interiorly beveled portion fitting over the opposite beveled side of the inverted V-shaped packing ring and adapted to constantly contact with said ring as the same wears away, and an opposite exteriorly beveled portion, an interiorly beveled packing follower taking over the exteriorly beveled portion of said auxiliary ring, and a packing spring arranged within the stuffing box and bearing against said follower, said auxiliary female packing under the pressure of the spring pressed follower being adapted to follow the diminishing shape of the V-packing ring, and assume the complete shape of the latter to fill the space between the collar and said follower after said packing ring has completely worn away, substantially as set forth.

In testimony that I claim the foregoing as my own I have hereto affixed my signature in the presence of two witnesses.

GEORGE W. FETNER.

Witnesses:
L. E. FARDE,
F. M. BULAND.